United States Patent [19]

Fram

[11] 4,266,924

[45] May 12, 1981

[54] TRANSMISSION DRIVE WITH CYCLIC SPEED VARIATIONS AND USES THEREOF IN COMPACTION SYSTEMS USING DUAL WIRE-MESH BELTS

[76] Inventor: Jerry R. Fram, 10627 Rochester Ave., Los Angeles, Calif. 90024

[21] Appl. No.: 65,189

[22] Filed: Aug. 9, 1979

[51] Int. Cl.³ .................... A01J 21/00; B32B 3/00; B32B 5/02
[52] U.S. Cl. ............................. 425/372; 156/580; 156/583.5; 100/153
[58] Field of Search ............... 156/580, 582, 583.5; 425/371, 372; 100/151–153

[56] References Cited

U.S. PATENT DOCUMENTS

| | | | |
|---|---|---|---|
| 2,326,889 | 8/1943 | Schulz | 425/372 |
| 3,850,213 | 11/1974 | Keaton | 156/583.5 |
| 3,993,426 | 11/1976 | Ahrweiler | 156/583.5 |
| 4,178,144 | 12/1979 | Tabler | 425/372 |

*Primary Examiner*—Douglas J. Drummond
*Attorney, Agent, or Firm*—Keil & Witherspoon

[57] ABSTRACT

Transmission systems in which a driven sprocket is driven by way of a chain by a driving sprocket which is driven by drive means at a constant speed of rotation, oscillating or reciprocating idler sprockets for superimposing on the constant speed of rotation drive a periodic, cyclic motion changing the speed of rotation of the driven sprocket, which periodic cyclic motion increases the length of the portion of said chain extending between the exit side of said driven sprocket and the entrant side of said driving sprocket while shortening by a corresponding amount the length of the portion of said chain extending between the exit side of said driving member and the entrant side of said driven member during one-half cycle of said cyclic motion and vice versa during the other half cycle of said cyclic motion, and duel wire-mesh belt compaction modules for the wetout of glass fiber rovings and sheet molding compound paste between thermoplastic polymer films sandwiched between two wire-mesh belts horizontally moving in the same direction and respectively driven by two drum rolls positioned at one end of the compaction system, and the above transmission system for imparting a velocity-variable motion to the wire-mesh belt driven by one of said drum rolls, to produce a shearing type of action between said belts.

6 Claims, 5 Drawing Figures

TRANSMISSION DRIVE WITH CYCLIC SPEED VARIATIONS AND USES THEREOF IN COMPACTION SYSTEMS USING DUAL WIRE-MESH BELTS

BACKGROUND

The subject invention relates to transmission systems in which an endless, flexible transmission medium (e.g., a chain, a belt, etc.) is driven at constant speed by a rotating driving member. The transmission medium drives the rotatable driven member. A pair of idler elements on opposite sides of the driven member and driven by the transmission medium are rotatably mounted on a linkage means (e.g., a rockable arm). The linkage means is moved in periodic, cyclic, linearly reciprocal or oscillating motion by which there is superimposed on the constant speed drive of the driven member by the transmission medium a secondary velocity which cyclically varies the speed of rotation of the driven member.

The invention also involves dual wire-mesh belt compaction modules for the wetout of glass fiber rovings and sheet molding compound paste between synthetic films sandwiched between the belts, wherein the subject transmission systems are employed to drive one of the drum rolls over which the one wire-mesh belt passes at cyclically-varying linear speed. The cyclic changing of the speed of one wire-mesh belt vis-a-vis the other, constant speed belt aids in attaining a more uniform wetout of the glass fiber rovings by the sheet molding compound by the shearing action derived from cyclic variations of the relative speeds of the upper wire-mesh belt and the lower wire-mesh belt.

PRIOR ART

The closest prior art, as currently known, is a machine built for Owens Corning Fiberglas, which machine embodied a dual wire-mesh belt compaction system. An oscillating component in the drive of one of the belts was attained by driving one of the drum rolls for one belt with a sprocket on a off-center axis and a spring loaded idler sprocket in the chain drive. The subject invention constitutes an improvement over the previously known machine.

BRIEF DESCRIPTION OF THE INVENTION

The subject invention relates to transmission systems in which a first, driven, rotatable member is driven by way of an endless, flexible transmission medium (e.g., an endless drive chain) by a second, driving rotatable member (e.g., a sprocket wheel) which is driven by drive means at a constant speed of rotation. The improvements reside in arrangements for superimposing on the constant speed of rotation drive by said driving member a periodic motion changing the speed of rotation of said driven member. These arrangements comprise a pair of rotatable idler elements (e.g., sprockets), each mounted on an axle. One of the idler elements is engaged by a first leg of said endless transmission medium on the entrant side of said driven member, and the other of said idler elements is engaged by a second leg of said endless transmission medium on the exit side of said driven member. The arrangements further embody linkage means (e.g., plates used as pivotable arms) for fixing the spacing between said axles, and means for imparting to said linkage means a periodically changing motion which periodically varies the speed of rotation of said driven member. Preferably, said last-mentioned means imparts a periodic cyclic motion which increases the length of the portion of said endless, flexible transmission medium (chain) extending between the exit side of said driven member and the entrant side of said driving member while shortening by a corresponding amount the length of the portion of said endless, flexible transmission medium extending between the exit side of said driving member and the entrant side of said driven member during one half cycle of said cyclic motion, and vice versa during the other half cycle of said cyclic motion. The periodically changing, cyclic motion may be an oscillating motion or a linearly reciprocating motion. Conveniently in the case of oscillating motion, the linkage means is mounted for oscillation about the axis of rotation of said driven member. Preferably, in the case of linearly reciprocal motion, the linkage means is mounted for reciprocating translational movement in a direction substantially perpendicular to the main plane of movement of said flexible transmission medium in the vicinity of the linkage means. In one illustrated embodiment, the idler elements are rotatably mounted by their axles respectively immediately adjacent to the entrant and exit sides of said driven member.

In the linear system, as well as the oscillating system, at least one pair of said rotatable idler elements has one idler element of each pair operatively positioned in the segment of said endless, flexible, transmission medium which moves toward said driving element while the other idler element at each pair is operatively positioned in the segment of said endless, flexible, transmission medium which moves toward said driven member. In the linearly reciprocable system, a plurality of said pairs of rotatable idler elements may be provided in tandem lengthwise of said endless flexible transmission medium. A separate linkage means for each said pair of elements is provided, each said linkage means being mounted for independent reciprocating translational movement, under the control of a separate movement-imparting means, in a direction substantially perpendicular to that of the lengthwise direction of said endless flexible transmission medium. The periodic movements imparted by said separate movement-imparting means are sinusoidal movements related to each other by a series of the type $A_0 + A_1 \sin \omega t + A_2 \sin 2\omega t + A_3 \sin 3\omega t + \ldots$, thereby to approximate an overall periodic movement by Fourier expansion.

The transmission systems may be used in a dual wire-mesh belt compaction system for the wetout of glass fiber rovings by a sheet molding compound paste positioned between synthetic polymer films which are sandwiched between two wire-mesh belts horizontally moving in the same direction and respectively driven by two drum rolls positioned at one end of the compaction system. In the most preferred forms, an arrangement for imparting a velocity-variable motion to the wire-mesh belt driven by one of said drum rolls is employed in order to produce a shearing type of action between said belts. Such arrangement comprises a first sprocket wheel coaxial with and coupled to one of said drum rolls; and a second sprocket wheel coaxial with and coupled to the other of said drum rolls, said first sprocket wheel being rotatably driven by an endless transmission chain driven by a drive sprocket wheel. The arrangement employs a pair of idler sprockets, each mounted on an axle, with one segment of said endless chain being partially wound around one of said idler sprockets and another segment of said chain being partially wound around the other of said idler sprockets. The axles of said two idler sprockets are rotatably mounted in a linkage arm, thereby fixing the spacing between said axles.

The arm is mounted for rocking movement about the axis of said first sprocket wheel.

Means for imparting to said arm an oscillating, rocking movement is employed in such a way that the length of the portion of said endless chain extending between the exit side of said first idler sprocket wheel and the entrant side of the first sprocket wheel is lengthened during a half cycle of said oscillating movement while the portion of said endless chain extending between the exit side of said first sprocket wheel and the entrant side of said second idler sprocket is shortened by a corresponding amount during said half cycle, and vice versa during the other half cycle of said oscillating movement. In the illustrated embodiments, both of the first and second sprocket wheels are rotatably driven by said chain.

In its broader aspects, the dual wire-mesh belt compaction module is one wherein the aforedescribed films are sandwiched between two wire-mesh belts horizontally moving in the same direction and respectively driven by two drum rolls positioned at one end of the compaction system; and the arrangement for imparting a velocity-variable motion to the wire-mesh belt driven by one of said drum rolls, thereby producing a shearing type of action between said belts, comprises a pair of rotatable idler elements each mounted on an axle, one of said idler elements being engaged by a first leg of said endless transmission medium on the entrant side of said driven member and the other of said idler elements being engaged by a second leg of said endless transmission medium on the exit side of said driven member; linkage means for fixing the spacing between said axles; and means for imparting to said linkage means a periodically changing motion which periodically varies the speed of rotation of said driven member, and said driven member being operatively connected to one of said drum rolls to rotatably drive said drum roll at oscillating, variable rates of rotation.

The compaction system preferably embodies an arrangement wherein said last-mentioned means imparts a periodical cyclic motion which increases the length of the portion of said endless, flexible transmission medium extending between the exit side of said driven member and the entrant side of said driving member while shortening by a corresponding amount the length of the portion of said endless, flexible transmission medium extending between the exit side of said driving member and the entrant side of said driven member during one half cycle of said cyclic motion, and vice versa during the other half cycle of said cyclic motion. The periodical cyclic motion may be an oscillating motion, or a linearly reciprocating motion.

PREFERRED EMBODIMENTS

Preferred embodiments of the transmission systems and the compaction systems of the subject invention are illustrated in the drawings, wherein.

Figure 1:
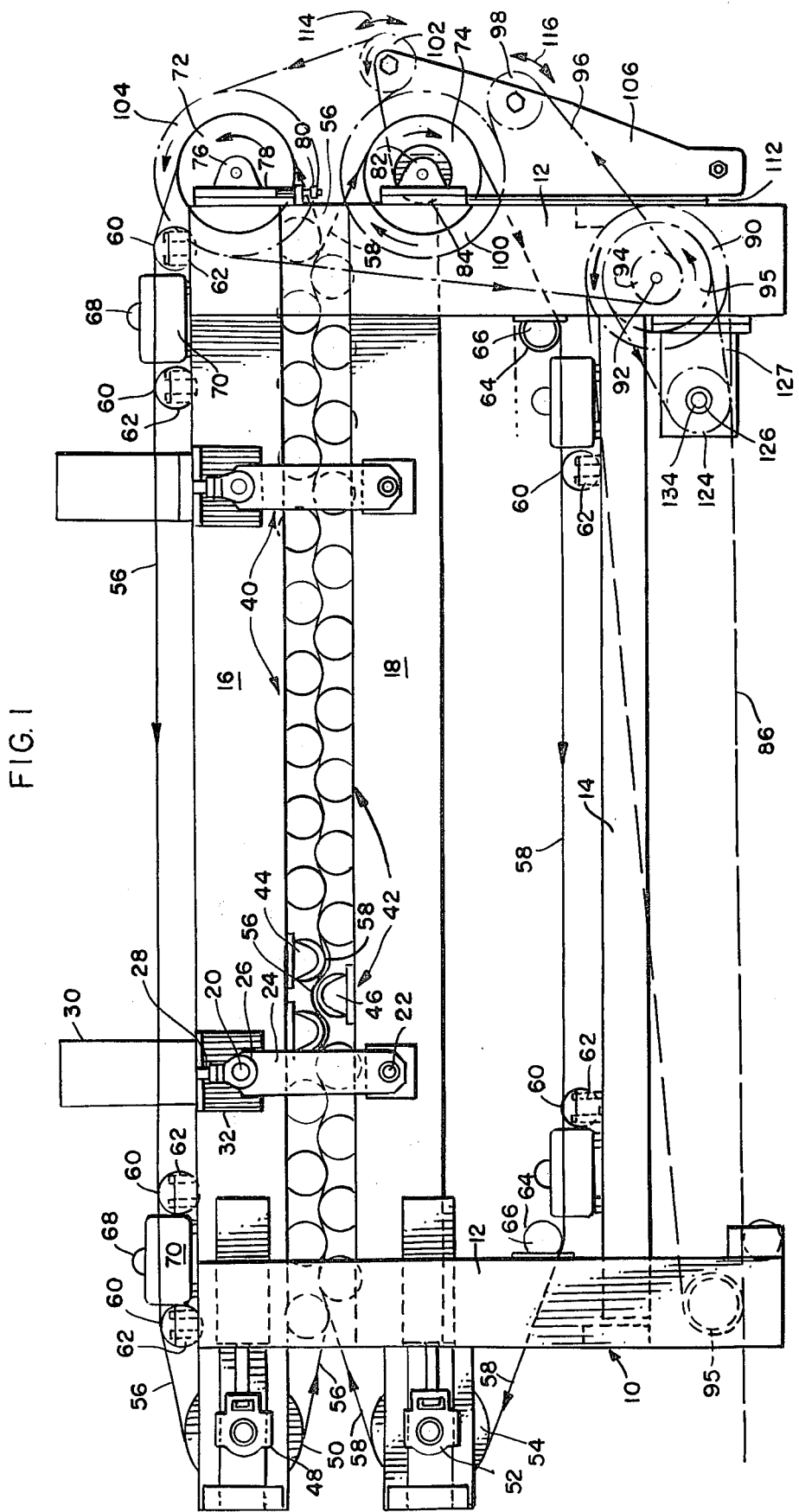
FIG. 1 is a side elevation of a dual wire-mesh compaction machine using the one embodiment of the transmission systems to drive the lower belt.
Figure 2:
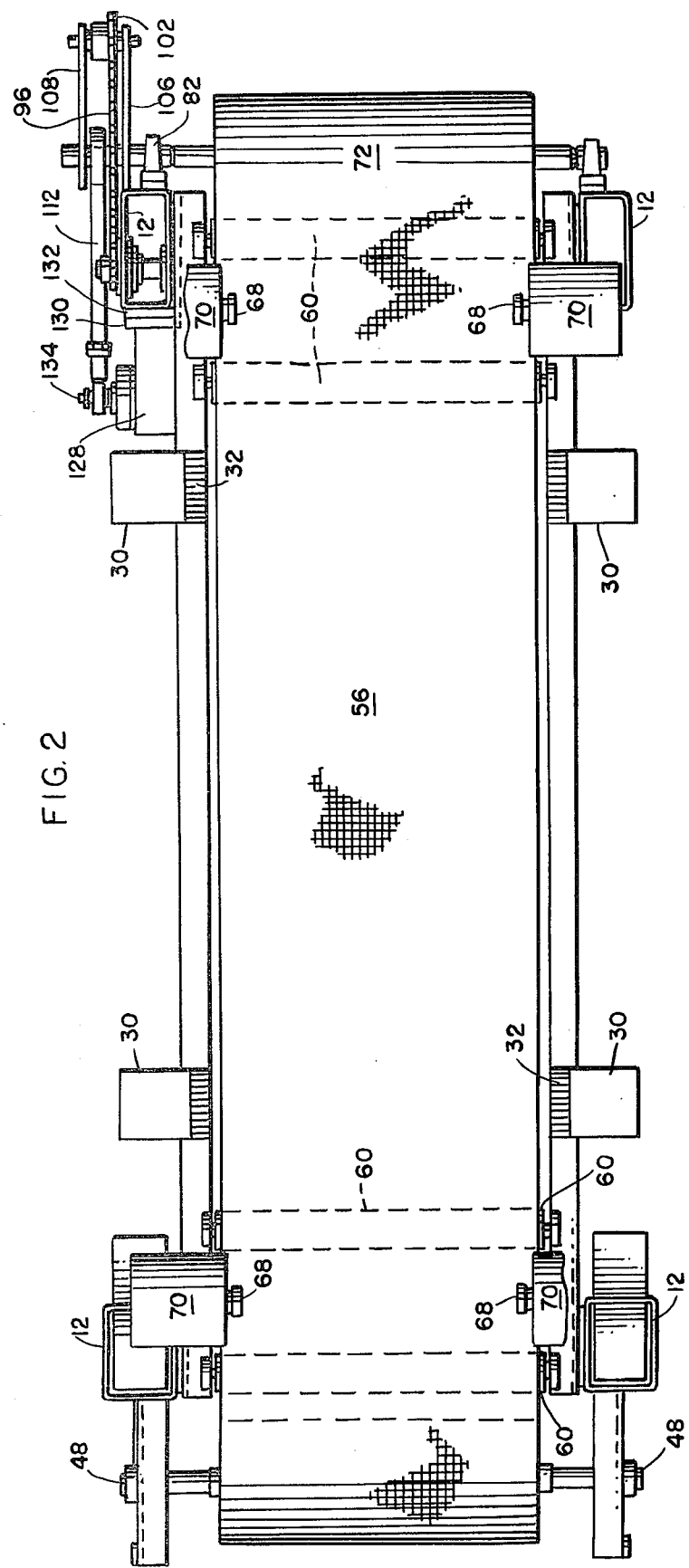
FIG. 2 is a top plan view of said machine.
Figure 3:
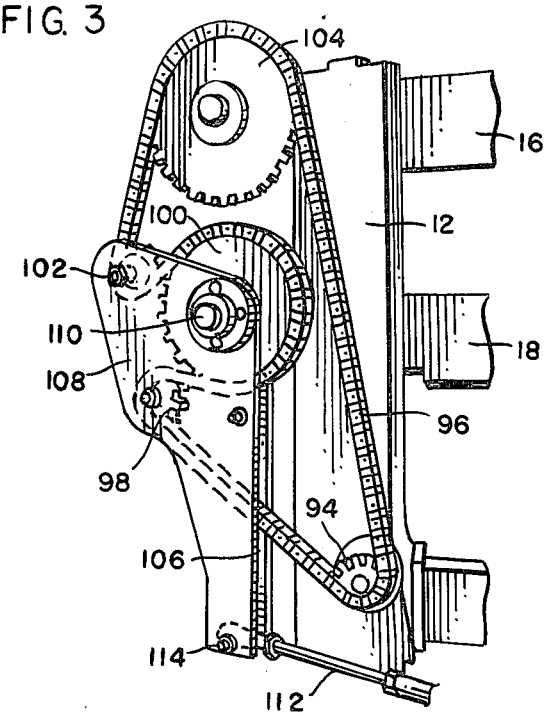
FIG. 3 is a fragmentary, perspective view of one corner of the machine having the oscillating arm.

Referring to the drawings, the dual wire-mesh compaction machine of FIGS. 1-3 has a frame 10 comprising four rectangularly tubular legs 12, side frame lower bars 14 on each side of the machine, an upper horizontal, roller assembly frame 36 and a lower, horizontal, roller assembly frame 34. The upper frame 36 has welded thereon four brackets 32, each bearing a pneumatic cylinder assembly 30. The piston rods 28 of each assembly project through the brackets and have a yoke 26 connected by pin connections 20 to respective link arms 24. The opposite ends of the link arms are connected by pins 22 to the lower roller assembly frame 34. The lower roller assembly frame 34 is moved up and down by the piston rods 28 of the pneumatic cylinders in the cylinder assemblies 30.

The upper roller assembly frame 36 is fixedly mounted on the machine frame. The rollers 40 are journalled in bearing assemblies 44, which are attached to the side members 16 of the upper roller assembly frame 36. The rollers 42 are journalled in bearing assemblies 46, which are mounted on the side frame members 18 of the lower roller assembly frame 34.

The latter roller assembly frame is suspended by the four links 24 coupled to the four piston rods 28 of the four pnewmatic cylinder assemblies 30. It may be lowered about 7" from the position shown in FIG. 1 to inspect the rollers, clean the rollers, etc. Also, though not absolutely essential to the performance of the compaction machine, one of the roller assembly frames 34 or 36 may be mounted for adjustable positioning in the horizontal direction from the alternately staggered position shown in FIG. 1, through one or more intermediate positions to a position wherein axes of rotation of the upper rollers 40 and lower rollers 42 respectively are vertically aligned.

The upper wire-mesh, endless belt 56 passes about the drum roll 50, which is journalled on the take-up bearing assemblies 48. The lower wire-mesh endless belt 58 similarly passes about the drum roll 54, which is journalled on the take-up bearing assemblies 52. Each endless belt 56, 58, on the return leg of its travel cycle, passes over a plurality of idler guide rolls 60 mounted on the respective upper and lower frame assemblies by bearings 62. The lower endless belt 58 also passes over the idler, guide rolls 64, whose bearings 66 are mounted on tubular legs 12 of the machine frame. Four guide wheels 68 are journalled in respective mounting blocks 70. These wheels keep the endless belts 56, 58 in proper alignment during travel of the latter over the various rolls 50, 54, 60 and 64.

The drum rolls 72, 74 are chain-driven. The drive chain 86 drives, via the drive sprocket 95, the sprocket 90, mounted in common on the countershaft 92 with the sprockets 94 and 95. The sprocket 94 drives the chain 96 in the arrowhead direction about idler sprocket 98, driven sprocket 100 for the drum roll 74, idler sprocket 102, driven sprocket 104 for the drum roll 72, and back to the sprocket 94.

The two idler sprockets 98, 102 are rotatably mounted between arms or links 106, 108 at a fixed distance between the axes of rotation of the idler sprockets. The arms or links 106, 108 are pivotably mounted on a shaft 110 which is part of, or is coaxial with, the shaft for the drum roll 74 and its driven sprocket 100.

A reciprocating shaft 112 is connected to the lower ends of the arms or links 106 by bolt 114 to impart oscillating motion to the arms or links 106. When the arms or links 106 oscillate in the half cycle away from the end of the machine, the idler sprocket 102 rises in an upward and inward arc as indicated by the double arrowheaded curved line 114. This has the effect of shortening the path of the chain 96 between sprocket 100 and upper sprocket 104, thereby in effect reducing the length of the return path of the chain from sprocket 100 to drive sprocket 94. Simultaneously, the idler sprocket 98 moves in an upward and outward arc as indicated by the double arrowheaded curved line 116. This has the effect of increasing the length of the path of the chain 96 between drive sprocket 94 and sprocket 100 by an amount of increase corresponding to the amount of decrease of the chain path between sprockets 100 and 104. This half cycle of oscillation, accordingly, has the effect of increasing the rate of rotation of the sprocket 100, which in turn increases the rate of rotation of drum roll 74 and the linear speed of the lower belt 58 driven by said drum roll. In the other half cycle of oscillation the reverse occurs, with the net result that the rate of rotation of sprocket 100 and its drum roll 74 decreases, as does the linear speed of the lower belt 58. The net result is that the linear speed of the lower belt 58 relative to the constant linear speed of the upper belt 56 varies eccentrically in cycles corresponding to the cycles of oscillation of the arms or links 106.

Drive is imparted to the upper endless belt 56 by the drum roll 72 while drive is imparted to the lower endless belt 58 by the drum roll 74. The drum roll 72 is journalled in bearing morses 76, which are mounted on spacer bearings 78, on which the respective bearing morse is vertically adjustably mounted—the vertical position being determined by the setting of thumb screw 80. The lower drum roll 74 is journalled on bearing morses 82 which are fixedly mounted on the spacer plate 84.

The main drive chain 86 is driven by drive sprocket 95, which in turn is driven directly or via another chain drive (not shown) by a motor (not shown). The drive chain 86 passes over a countershaft assembly and around the driven sprocket 90. The sprocket 95 drives via chain 127 the sprocket 124, which is rotatably mounted, along with the eccentric drive 126, by a shaft 134 journalled in the bearing block 128, which in turn is mounted by spacers 130,132 on a tubular leg 12. The rod 112, which oscillatingly pivots the arms or links 106,108, is reciprocally driven by the eccentric drive member 126, to which the rod is connected.

Figure 4:
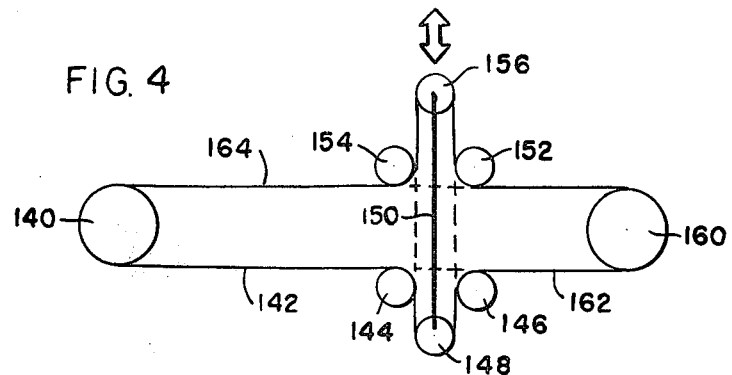
FIG. 4 is a diagrammatic view of a second embodiment of the transmission systems.

In the alternate drive system shown in FIG. 4, a constant speed driver 140, e.g., a sprocket or pulley, drives the lower flight of the chain or belt 142 about a lower set of idler sprockets or pulleys 144,146 with stationary axes of rotation, and an intermediary idler sprocket or pulley 148, which is journalled on the lower end of a vertically reciprocable link 150. A second upper set of sprockets or pulleys composed of two idler sprockets or pulleys 154,152 with stationary axes of rotation and an intermediary, idler sprocket or pulley 156, which is rotatably mounted on the upper end of link 150, are positioned in the upper flight of the chain or belt 142.

The drive sprocket or pulley 140 drives the driven sprocket or pulley 160 at a constant speed when the link 150 is stationary. When the link 150 moves upwardly and downwardly in sinusoidal motion, the upward movement of the link slows the rate of rotation of the driven sprocket 160 because the tensioned, lower flight 162 decreases in overall length between sprocket 160 and sprocket 140 as the idler sprocket or pulley moves upward. Simultaneously, the slack, upper flight 164 increases in length by amounts corresponding to the decrease in length of the lower flight. The reverse occurs as the link 150 moves downwardly, i.e., the rate of rotation of the driven sprocket or pulley increases as the length of the lower flight 162 becomes longer and the length of the upper flight 164 becomes correspondingly shorter.

Figure 5:
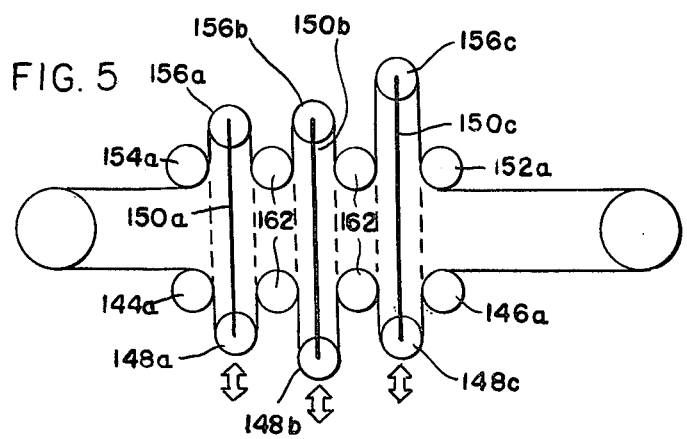
FIG. 5 is a diagrammatic view of a third embodiment of the transmission systems.

The embodiment of FIG. 5 is similar to that of FIG. 4 but has three independently vertically reciprocable, vertical links 150a, 150b and 150c, each having an upper idler sprocket or pulley 156a, 156b and 156c journalled on its respective upper end and a lower idler sprocket or pulley 148a, 148b and 148c journalled on its respective lower end.

Idler sprockets or pulleys 144a, 146a, 152a and 154a with stationary axes of rotation deflect the chain or belt from the direct flight path to a vertical path and vice versa in the same manner as sprockets or pulleys 144, 146, 152 and 154 in FIG. 4. Additional, intermediary sprockets or pulleys 162 with stationary axes of rotation between the link pairs 150a, 150b and 150b, 150c deflect the chain or belt 180° as it travels between the adjacent sprockets or pulleys journalled on the ends of the links 150a, 150b and 150c. The reciprocations of the respective links, while the drive sprocket or pulley rotates at a constant speed $A_o$, impart to the speed of the chain or belt 142 sinusoidal speed oscillations whereby the driven sprocket has a speed corresponding to $A_o + A_1 \sin \omega t + A_2 \sin 2\omega t + A_3 \sin \omega t \ldots$ This principle can be extended to approximate any periodic motion by Fourier expansion.

It will be appreciated from the foregoing that the invention herein can take many forms other than the preferred forms shown in the drawings and that the invention as herein claimed is not limited to the illustrated embodiments.

I claim:

1. In a dual wire-mesh belt compaction system for the wetout of glass fiber rovings by a sheet molding compound paste carried between films which are sandwiched between two wire-mesh belts horizontally moving in the same direction and respectively driven by two drum rolls positioned at one end of the compaction system, an arrangement for imparting a velocity-variable motion to the wire-mesh belt driven by one of said drum rolls, thereby to produce a shearing type of action between said belts, said arrangement comprising:

a first sprocket wheel coaxial with and coupled to one of said drum rolls, a second sprocket wheel coaxial with and coupled to the other of said drum rolls, said first sprocket wheel being rotatably driven by an endless transmission chain driven by a drive sprocket wheel, a pair of idler sprockets, each mounted on an axle, one segment of said endless chain being partially would around one of said idler sprockets and another segment of said chain being partially wound around the other of said idler sprockets, a linkage arm in which the axles of said two idler sprockets are rotatably mounted, thereby to fix the spacing between said axles, said arm being mounted for rocking movement about the axis of said first sprocket wheel, and means for imparting to said arm an oscillating, rocking movement in such a way that the length of the portion of said endless chain extending between the exit side of said first idler sprocket wheel and the entrant side of the drive sprocket wheel is lengthened during a half cycle of said oscillating movement while the portion of said endless chain extending between the exit side of said drive sprocket wheel and the entrant side of said first idler sprocket is shortened by a corresponding amount during said half cycle, and vice versa during the other half cycle of said oscillating movement.

2. In a transmission system the arrangement as claimed in claim 1 wherein said first and second sprocket wheels are rotatably driven by said chain.

3. In a dual wire-mesh belt compaction system for the wetout of glass fiber rovings by a sheet molding compound paste carried between films which are sandwiched between two wire-mesh belts horizontally moving in the same direction and respectively driven by two drum rolls positioned at one end of the compaction system, an arrangement for imparting a velocity-variable motion to the wire-mesh belt driven by one of said drum rolls, thereby to produce a shearing type of action between said belts, said arrangement comprising:

a pair of rotatable idler elements each mounted on an axle, one of said idler elements being engaged by a first leg of said endless transmission medium on the entrant side of said driven member and the other of said idler elements being engaged by a second leg of said endless transmission medium on the exit side of said driven member, linkage means for fixing the spacing between said axles, and means for imparting to said linkage means a periodically changing motion which periodically varies the speed of rotation of said driven member, and said driven member being operatively connected to one of said drum rolls to rotatably drive said drum roll at oscillating, variable rates of rotation.

4. In a compaction system as claimed in claim 3, the arrangement wherein said last-mentioned means imparts a periodical cyclic motion which increases the length of the portion of said endless, flexible transmission medium extending between the exit side of said driven member and the entrant side of said driving member while shortening by a corresponding amount of length of the portion of said endless, flexible transmission medium extending between the exit side of said driving member and the entrant side of said driven member during one half cycle of said cyclic motion, and vice versa during the other half cycle of said cyclic motion.

5. In a compaction system as claimed in claim 4, the arrangement wherein said periodical cyclic motion is an oscillating motion.

6. In a compaction system as claimed in claim 4, the arrangement wherein said periodical cyclic motion is a linearly reciprocating motion.

* * * * *